United States Patent

Nagano

[11] Patent Number: 4,707,706
[45] Date of Patent: Nov. 17, 1987

[54] THERMAL COLOR RECORDING APPARATUS

[75] Inventor: Fumikazu Nagano, Yamatokoriyama, Japan

[73] Assignee: Sharp Kabushiki Kaisha, Osaka, Japan

[21] Appl. No.: 908,723

[22] Filed: Sep. 18, 1986

[30] Foreign Application Priority Data

Sep. 20, 1985 [JP] Japan .................................. 60-209091

[51] Int. Cl.⁴ .......................... G01D 15/10; B41J 3/20; H04N 1/46
[52] U.S. Cl. ................................. 346/76 PH; 346/46; 358/75; 358/298; 400/120
[58] Field of Search ............. 346/46, 76 PH; 400/120; 358/298, 75

[56] References Cited

U.S. PATENT DOCUMENTS 4,536,772  8/1985  Isogai ............................. 346/76 PH
4,586,834  5/1986  Hachisuga et al. .................. 400/120

OTHER PUBLICATIONS

"High Resolution Thermal Ink Transfer Color Printer" by Yoshida et al., SID International Symposium—Digest of Technical Papers, May 1985.
"Desktop Color Document Scanner" by F. Nagano; SID International Symposium—Digest of Technical Papers, May 1985.

Primary Examiner—E. A. Goldberg
Assistant Examiner—Gerald E. Preston
Attorney, Agent, or Firm—Birch, Stewart, Kolasch, & Birch

[57] ABSTRACT

A thermal recording apparatus including a thermal head provided with a plurality of heating elements each having a predetermined value of resolution in a feed direction of a recording paper sheet, and a printer control circuit having first and second feed control members for feeding, at the time of recording scanning of each line of the recording paper sheet, the recording paper sheet through an interval of a half of the predetermined value and an interval of the predetermined value multiplied by a natural number, respectively such that feed of the recording paper sheet is controlled by the first and second feed control members at the time of recording of hues of yellow, magenta and cyan and a hue of black, respectively.

4 Claims, 6 Drawing Figures

THERMAL COLOR RECORDING APPARATUS

BACKGROUND OF THE INVENTION

The present invention relates to recording apparatuses and more particularly, to the recording controls of a thermal recording apparatus which is capable of recording middle tones.

Conventionally, dither method is known as one method for displaying middle tones. In this known method, middle tones are displayed on the basis of the density of dots per unit area. For example, in the case where a unit area has 16 (=4×4) dots, it is possible to obtain 16 gradations. Namely, in known thermal recording apparatuses, recording is performed in which two values, i.e. "1" for performing printing and "0" for preventing printing are merely allotted to each heating element. In the known thermal recording apparatuses, in order to display middle tones (color density) by these two values, a set of a plurality of dots, (i.e. dots having a matrix of 4×4) are used as one picture element such that middle tones are recorded by changing, in the dots of the picture element, a ratio of the number of dots to be printed to the number of the remaining dots not to be not printed.

However, in the prior art thermal recording apparatuses referred to above, since one gradation in the picture element (4×4 dots) corresponds to an area of one dot, display of the number of gradations is restricted, to 16 ways by the area of the dots (4×4 dots). Thus, the prior art thermal recording apparatuses have such a drawback that gradations cannot be displayed sufficiently.

In order to obviate the above described drawback of the prior art thermal recording apparatuses, such a recording method is recently proposed in which a recording paper sheet is fed through an interval of a half of the area of one dot at the time of recording scanning of each line of the recording paper sheet so as to be scanned for recording at the feeding interval of a half of the area of one dot such that gradations with a higher resolution can be displayed. However, in the case where color recording is performed by this method, such a problem arises that since all hues of yellow (Y), magenta (M), cyan (C) and black (BK) are scanned at an identical recording speed, a long time period is required therefor.

It should be noted that the hues of Y, M, C and BK are not necessarily required to be printed at an identical speed (identical gradation). Printing the hue of BK at a higher speed (lower gradation) than the hues of Y, M and C offers no problem for practical recording of images.

SUMMARY OF THE INVENTION

Accordingly, an essential object of the present invention is to provide a thermal recording apparatus which is capable of displaying gradations with a higher resolution and a higher printing speed as well as substantially eliminating the disadvantages inherent in conventional thermal recording apparatuses of this kind.

In the thermal recording apparatus of the present invention, printing speeds (gradations) of hues of Y, M and C and a hue of BK are made different from each other, namely, images of the hue of BK are recorded at a higher speed (lower gradation) than those of the hues of Y, M and C.

More specifically, in order to accomplish this object of the present invention, a thermal recording apparatus according to the present invention comprises: a thermal head which is provided with a plurality of heating elements each having a predetermined value of resolution in a feed direction of a recording paper sheet; a first feed control means for controlling feed of the recording paper sheet so as to feed the recording paper sheet through an interval of a half of the predetermined value at the time of recording scanning of each line of the recording paper sheet by said thermal head; and a second feed control means for controlling feed of the recording paper sheet so as to feed the recording paper sheet through an interval of the predetermined value multiplied by a natural number at the time of recording scanning of each line of the recording paper sheet by said thermal head, wherein feed of the recording paper sheet is controlled by said first feed control means at the time of recording of hues of yellow, magenta and cyan and is controlled by said second feed control means at the time of recording of a hue of black.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
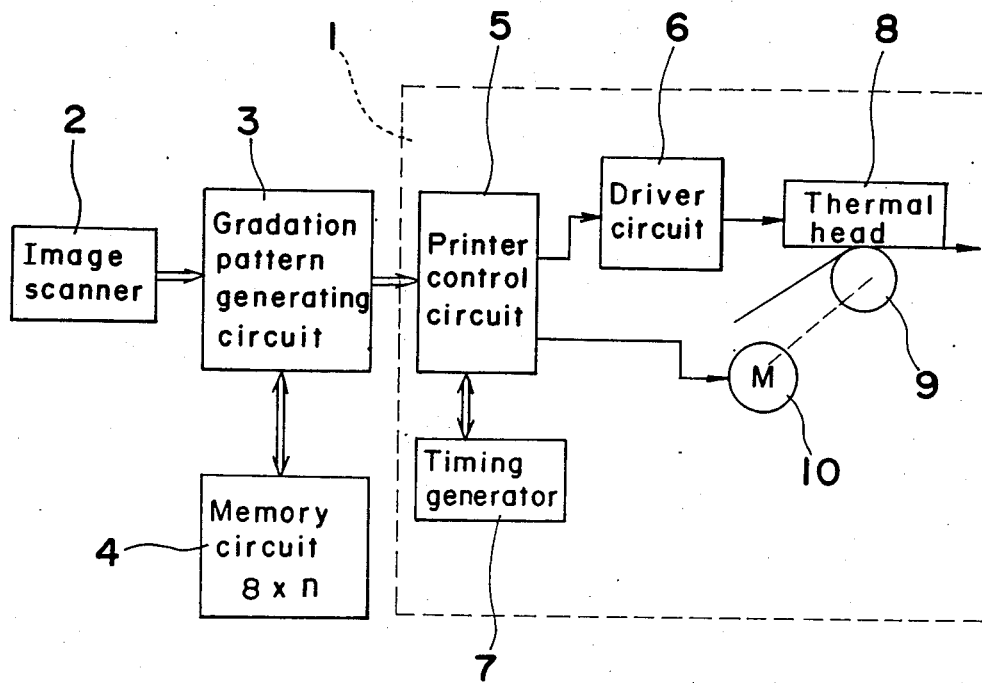
FIG. 1 is a block diagram showing a schematic structure of a thermal recording apparatus according to the present invention.

Referring now to the drawings, there is shown in FIG. 1, a thermal recording apparatus 1 according to one preferred embodiment of the present invention, which is enclosed by broken lines. In FIG. 1, reference numeral 2 denotes an image scanner, reference numeral 3 denotes a gradation pattern generator constituted by, for example, a data processor and reference numeral 4 denotes a memory circuit. An image signal read by the image scanner 2 is transmitted, as a gradation signal having five bits per picture element, to the gradation pattern generator 3. The gradation signal inputted to the gradation pattern generator 3 is expanded into a predetermined gradation pattern, for example, using the dither method by the gradation pattern generator 3 and then, the predetermined gradation pattern is stored in the memory circuit 4. The memory circuit 4 has a capacity of at least (8×n) bits (n=natural number). Line data are read for each recording line of the thermal recording apparatus 1 so as to be supplied to a printer control circuit 5 of the thermal recording apparatus 1.

The thermal recording apparatus 1 includes the printer control circuit 5, a driver circuit 6, a timing generator 7, a thermal head 8, a platen 9 for feeding a recording paper sheet and a stepping motor 10 for driving the platen 9.

Figure 2:
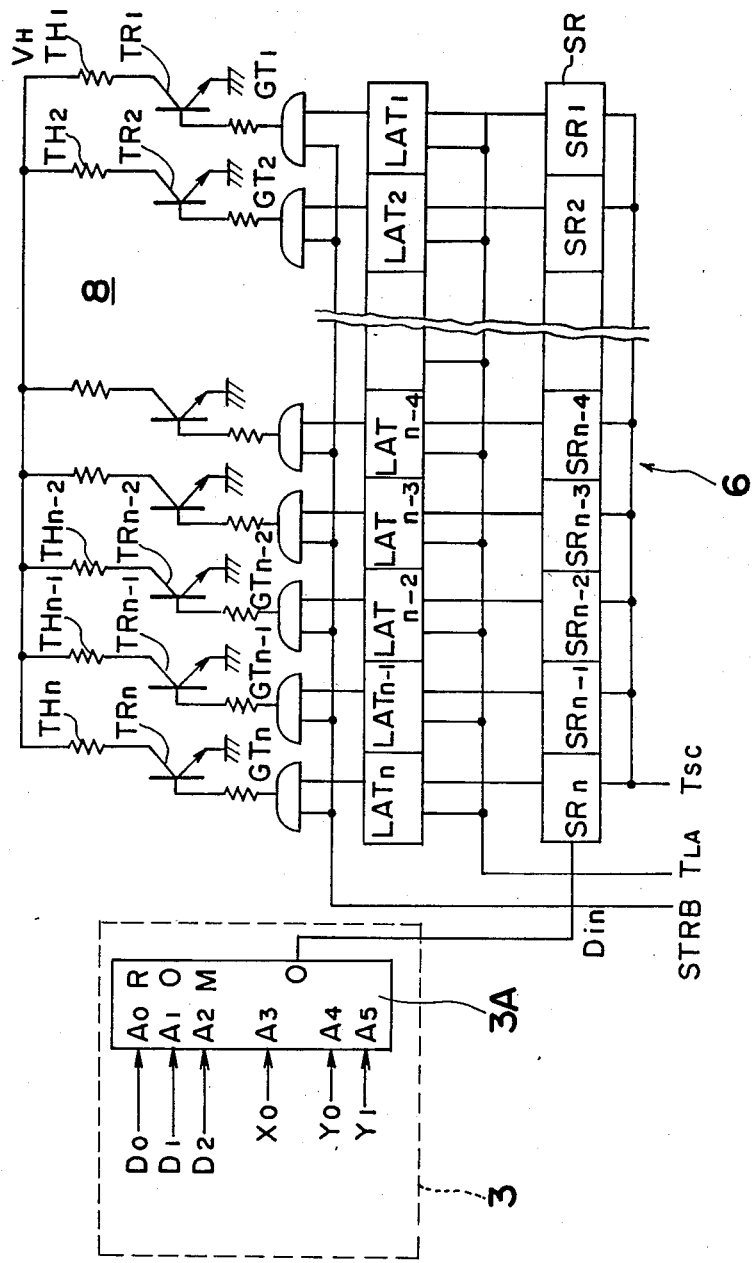
FIG. 2 is a view showing a driver circuit employed in the thermal recording apparatus of FIG. 1.

Referring to FIG. 2, there is shown the driver circuit 6. In FIG. 2, the thermal head 8 has n heating elements $TH_1$ to $TH_n$ which are subjected to on-off control by n switching elements (transistors) $TR_1$ to $TR_n$, respectively. Control gates (AND gates) $GT_1$ to $GT_n$ are connected to bases of the switching elements $TR_1$ to $TR_n$, respectively. A strobe signal STRB commanding recording operation is applied to one input terminal of each of the control gates $GT_1$ to $GT_n$. Meanwhile, a latch output of each of latch circuits $LAT_1$ to $LAT_n$ corresponding to the control gates $GT_1$ to $GT_n$, respectively, are applied to the other input terminal of each of the control gates $GT_1$ to $GT_n$. Recording data of one line inputted to a shift register SR having bits of $SR_1$ to $SR_n$ are latched from the shift register SR synchronously with a timing signal $T_{LA}$ by the latch circuits $LAT_1$ to $LAT_n$. Meanwhile, the recording data of one line are inputted to the shift register SR from a data input line Din and are sequentially shifted rightwards in FIG. 2 synchronously with a shift clock Tsc such that the recording data of one line are inputted to the shift register SR. Accordingly, when a recording data "1" is inputted to the bit of $SR_n$ of the shift register SR and is latched synchronously with the timing signal $T_{LA}$ by the latch circuit $LAT_n$ and further when, the strobe signal STRB is outputted to the control gates $GT_1$ to $GT_n$, the control gate $GT_n$ is opened, so that the switching element $TR_n$ is turned on and thus, the heating element $TH_n$ is electrically conducted.

Figure 3:
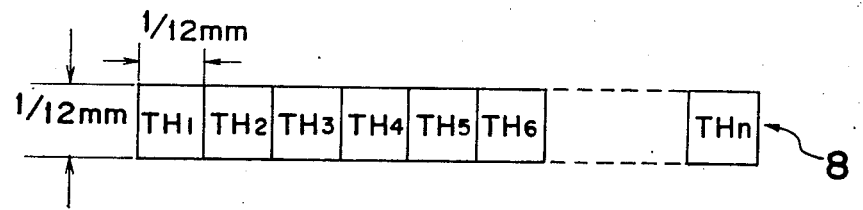
FIG. 3 is a view showing a structure of a thermal head employed in the thermal recording apparatus of FIG. 1.

As shown in FIG. 3, the thermal head 8 has the heating elements $TH_1$ to $TH_n$ for recording one line on the recording paper sheet. Each of the heating elements $TH_1$ to $Th_n$ has a length of 1/12 mm and a breadth of 1/12 mm. The recording paper sheet is fed in a direction extending upwardly and downwardly in FIG. 3. The heating elements $TH_1$ to $TH_n$ are arranged at a predetermined pitch of 1/12 mm (breadth of each of the heating elements $Th_1$ to $TH_n$) in the direction at right angles to the feed direction of the recording paper sheet.

Meanwhile, the printer control circuit 5 of the thermal recording apparatus 1 includes a first feed control means for controlling feed of the recording paper sheet, i.e. for controlling a drive system of the stepping motor 10 and the platen 9 so as to feed the recording paper sheet through a half of the length of each of the heating elements $TH_1$ to $TH_n$, i.e. $(1/12 \times \frac{1}{2})$ mm at the time of recording scanning of each line of the recording paper sheet This step is accomplished the thermal head 8 and a second feed control means for controlling the drive system of the stepping motor 10 and the platen 9 so as to feed the recording paper sheet through the length of each of the heating elements $TH_1$ to $Th_n$ multiplied by a natural number P, i.e. $(1/12 \times P)$ mm at the time of recording scanning of each line of the recording paper sheet by the thermal head 8. In this embodiment, the natural number P is set at 1.

Figure 4A:
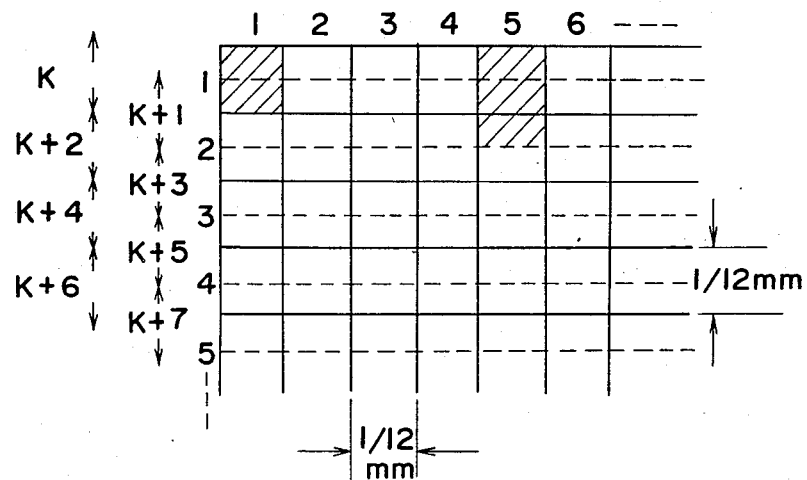
FIGS. 4a and 4b are views indicative of one example of recording of the thermal recording apparatus of FIG. 1.

Namely, the first feed control means is actuated at the time of recording hues of yellow (Y), magenta (M) and cyan (C). As shown in FIG. 4a, assuming that character K denotes an arbitrary natural number, a line 1, namely, matrix components 1-1, 1-2, 1-3, ---, 1-n are scanned for recording of the hues of Y, M and C by the thermal head 8 at a K-th recording scanning. After completion of this K-th scanning of the thermal head 8, the recording paper sheet is fed through an interval of $(1/12 \times \frac{1}{2})$ mm, i.e. upper halves of the matrix components 1-1, 1-2, 1-3, ---, 1-n. Thus, at the time of the (K+1)-th recording scanning, lower halves of the matrix components 1-1, 1-2, 1-3, ---, 1-n and an upper half of a line 2, i.e. upper halves of matrix components 2-1, 2-2, 2-3, ---, 2-n are scanned for recording by the thermal head 8. Subsequently, (K+2)-th recording scanning, (K+3)-th recording scanning and so on are performed likewise. Conventionally, it has been possible to display only 16 gradations in the dither method by using a matrix of 4×4. However, in accordance with the present invention, it becomes possible to display double, i.e. 32 gradations by using the matrix of 4×4. In other words, in accordance with the present invention, it becomes possible to display gradations with a higher resolution.

Figure 4B:
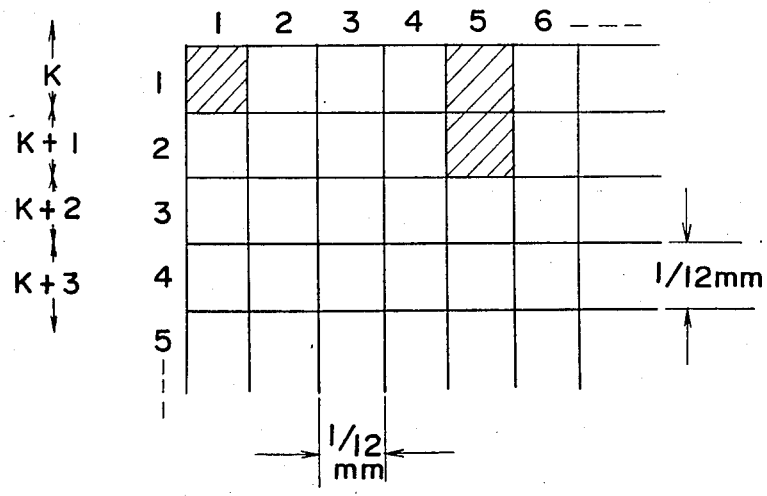

On the other hand, the second feed control means is actuated at the time of recording a hue of black (BK). As shown in FIG. 4b, at a K-th recording scanning of the hue of BK, the line 1, i.e. the matrix components 1-1, 1-2, 1-3, ---, 1-n are scanned for recording the hue of BK by the thermal head 8. After completion of the K-th recording scanning, the recording paper sheet is fed through an interval of 1/12 mm. Thus, at the time of (K+1)-th recording scanning, the line 2, i.e. the matrix components 2-1, 2-2, 2-3, ---, 2-n are scanned for recording by the thermal head 8. Thereafter, (K+2)-th recording scanning, (K+3)-th recording scanning and so on are performed similarly. The hue of BK is not required to be recorded at gradations identical with those of the hues of Y, M and C. Namely, recording of the hue of BK at a low gradation actually poses no problem to recording of images. Therefore, in order to increase the feed speed of the recording paper sheet, the feed speed of the recording paper sheet at the time of recording the hue of BK is made higher than the speed at the time of recording of the hues of Y, M and C. In FIGS. 4a and 4b, it is assumed that each of the blocks 1-1, 1-2, ---, 2-1, 2-2, ---, etc. represents one heating element having a length of 1/12 mm and a breadth of 1/12 mm.

Figure 5:
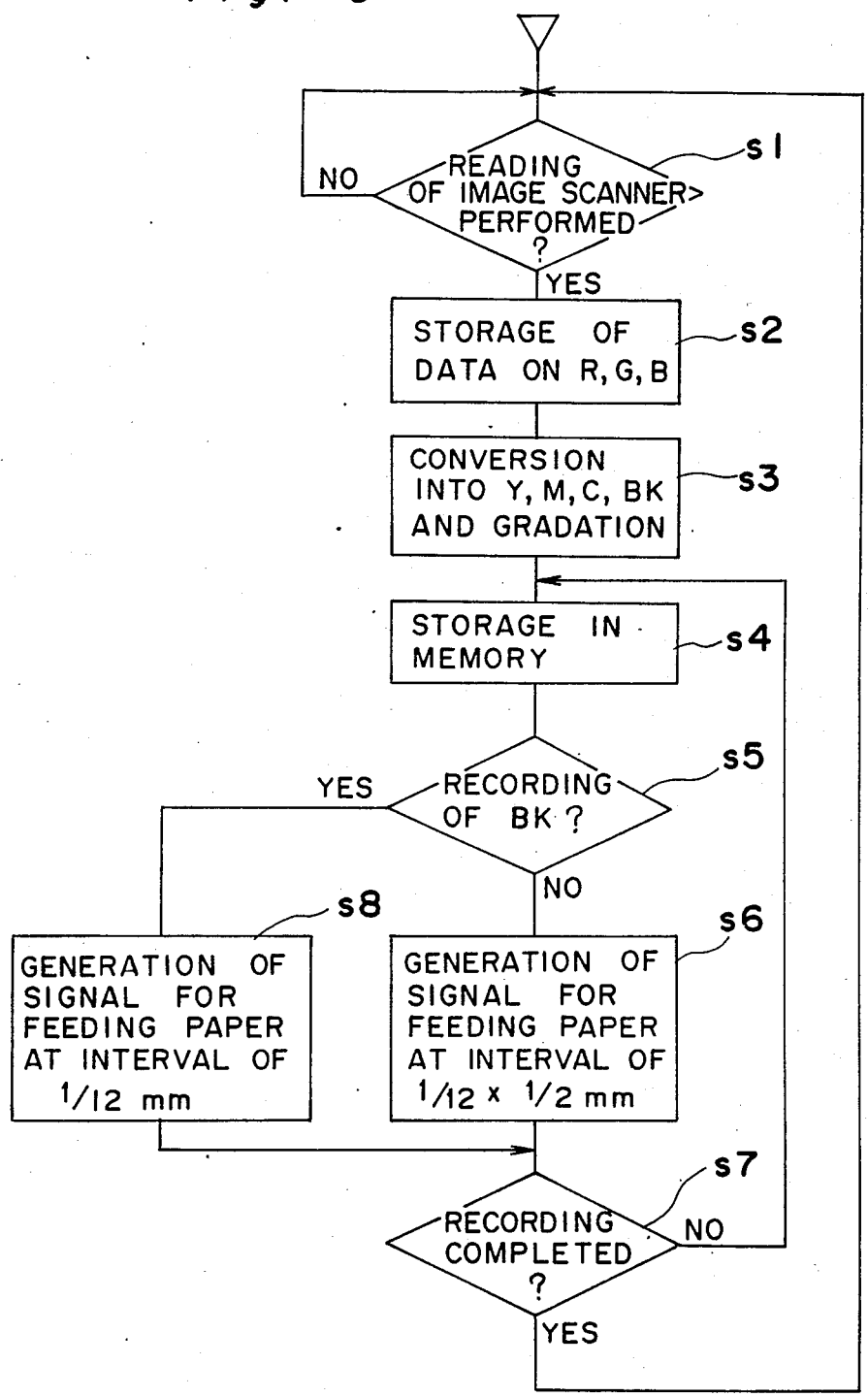
FIG. 5 is a flow chart showing an operational sequence of the thermal recording apparatus.

Hereinbelow, an operational sequence of the thermal recording apparatus 1 will be described with reference to a flow chart of FIG. 5. Initially, at step s1, an image signal is read by the image scanner 2. Thereafter, data on hues of red (R), green (G) and blue (B) of the image signal read from the image scanner 2 are stored in the the gradation pattern generator 3 at step s2 and then, are converted into data on the hues of Y, M, C and BK and gradations at step s3. Subseqently, the converted data are temporarily stored in the memory circuit 4 at step s4. At the time of the recording of images, the data stored in the memory circuit 4 are read from the memory circuit 4 in the sequence of the hue of Y, the hue of M, the hue of C and the hue of BK. At step s5, a decision is made as to whether or not the hue to be recorded is the hue of BK. In the case of "NO" at step s5, namely, when the hues of Y, M and C are recorded, the printer control circuit 5 actuates the first feed control means at step s6 such that the first feed control means generates a first paper feeding signal for feeding the recording paper sheet through the interval of $(1/12 \times \frac{1}{2})$ mm at the time of recording scanning of each line of the recording paper sheet. Upon generation of the first paper feeding signal, the platen 9 is driven through the stepping motor 10 so as to feed the recording paper sheet through the interval of $(1/12 \times \frac{1}{2})$ mm at the time of recording scanning of each line of the recording paper sheet. Then, if it is found at step s7 that recording has been completed, the program flow returns to step s1.

On the contrary, in the case of "YES" at step s5, namely, when the hue of BK is recorded, the printer control circuit 5 actuates the second feed control means at step s8 such that the second feed control means generates a second paper feeding signal for feeding the recording paper sheet through the interval of 1/12 mm at the time of recording scanning of each line of the recording paper sheet. In the same manner as described above, upon generation of the second paper feeding signal, the platen 9 is driven through the stepping motor 10 so as to feed the recording paper sheet through the interval of 1/12 mm at the time of recording scanning of each line of the recording paper sheet. Step s8 is followed by step s7.

As is clear from the foregoing description, in the thermal recording apparatus of the present invention, the thermal head is provided with a plurality of heating elements each having the predetermined value of resolution in the feed direction of the recording paper sheet. Further the feed of the recording paper sheet is controlled such that the recording paper sheet is fed, at the time of recording scanning of each line of the recording paper sheet, through an interval of a half of the prdetermined value of resolution and an interval of the predetermined value of resolution multiplied by a natural number in the case of recording of the hues of Y, M and C and the hue of BK, respectively.

Accordingly, in accordance with the present invention, since the print speed of the hues Y, M and C is made different from that of the hue of BK, it becomes possible to obtain the thermal recording apparatus which is capable of displaying gradations with a higher resolution at a high recording speed.

Although the present invention has been fully described by way of example with reference to the accompanying drawings, it is to be noted here that various changes and modifications will be apparent to those skilled in the art. Therefore, unless such changes and modifications depart from the scope of the present invention, the should be construed as being included therein.

What is claimed is:

1. In a thermal recording apparatus including a thermal head including a plurality of heating elements, and means for feeding a recording paper sheet in a direction at right angles to a recording line of said thermal head, wherein recording on the recording paper sheet is sequentially performed upon recording scanning of the recording paper sheet in a direction of the recording line by said thermal head and feed of the recording paper sheet by said means, the improvement comprising:

said heating elements each having a predetermined value of resolution in a feed direction of the recording paper sheet;

a printer control circuit including, first feed control means for controlling feed of the recording paper sheet so as to feed the recording paper sheet through an interval of a half of the predetermined value at the time of recording scanning of each line of the recording paper sheet by said thermal head, second feed control means for controlling feed of the recording paper sheet so as to feed the recording paper sheet through an interval of the predetermined value multiplied by a natural number at the time of recording scanning of each line of the recording paper sheet by said thermal head;

wherein feed of the recording paper sheet is controlled by said first feed control means at the time of recording of hues of yellow, magenta and cyan and is controlled by said second feed control means at the time of recording of a hue of black.

2. A thermal recording apparatus as claimed in claim 1, wherein the natural number is set at 1.

3. A thermal recording apparatus as claimed in claim 1, wherein the predetermined value is set at 1/12 mm.

4. A thermal recording apparatus as claimed in claim 2, wherein the predetermined value is set at 1/12 mm.

* * * * *